(12) United States Patent
Tanaka

(10) Patent No.: US 10,589,577 B2
(45) Date of Patent: Mar. 17, 2020

(54) HEAVY-DUTY PNEUMATIC TIRE

(71) Applicant: Sumitomo Rubber Industries, Ltd., Kobe-shi, Hyogo (JP)

(72) Inventor: Kaori Tanaka, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 295 days.

(21) Appl. No.: 15/208,758

(22) Filed: Jul. 13, 2016

(65) Prior Publication Data
US 2017/0015145 A1   Jan. 19, 2017

(30) Foreign Application Priority Data
Jul. 14, 2015   (JP) .................................. 2015-140383

(51) Int. Cl.
  *B60C 15/06*   (2006.01)
  *B60C 15/04*   (2006.01)
  *B60C 15/00*   (2006.01)

(52) U.S. Cl.
  CPC .......... *B60C 15/0635* (2013.01); *B60C 15/04* (2013.01); *B60C 15/0607* (2013.01);
  (Continued)

(58) Field of Classification Search
  CPC ............ B60C 15/06; B60C 2015/0614; B60C 15/0628; B60C 15/0632; B60C 15/0635;
  (Continued)

(56) References Cited

U.S. PATENT DOCUMENTS 3,921,693 A   11/1975   Suzuki et al.
4,319,621 A   3/1982    Motomura et al.
(Continued)

FOREIGN PATENT DOCUMENTS

EP   0202925 A2   11/1986
JP   60050006 A * 3/1985 ............. B60C 15/06
(Continued)

OTHER PUBLICATIONS

Machine Translation: JP-2008110624-A; Naruo, Akira; (Year: 2018).*
(Continued)

*Primary Examiner* — Kendra Ly
(74) *Attorney, Agent, or Firm* — Birch, Stewart, Kolasch & Birch LLP

(57) ABSTRACT

A heavy-duty pneumatic tire includes a carcass ply including a main portion extending between bead cores and a pair of turn-up portions, a first reinforcing layer of a steel cord disposed in each bead portion in a U-shaped manner, and a second reinforcing layer of an organic fiber cord disposed in each bead portion and at least a part of the second reinforcing layer extending in a radial direction of the tire at an axially outward location of the first reinforcing layer. The second reinforcing layer includes an axially inner second ply and an outer second ply. The outer second ply has an inner end positioned below the bead core. The inner second ply has an inner end located axially inward of the inner end of the outer second ply, and has a substantially same length as the outer second ply in a tire cross-section.

20 Claims, 4 Drawing Sheets

(52) U.S. Cl.
CPC ...... B60C 15/0632 (2013.01); *B60C 15/0027* (2013.01); *B60C 15/0653* (2013.01); *B60C 2015/009* (2013.01); *B60C 2015/048* (2013.01); *B60C 2015/066* (2013.01); *B60C 2015/0614* (2013.01); *B60C 2015/0664* (2013.01); *B60C 2015/0667* (2013.01); *B60C 2015/0678* (2013.01); *B60C 2015/0692* (2013.01); *B60C 2200/06* (2013.01)

(58) Field of Classification Search
CPC ........ B60C 15/0653; B60C 2015/0639; B60C 2015/0642; B60C 2015/0646; B60C 2015/065; B60C 2015/0657; B60C 2015/066; B60C 2015/0664; B60C 2015/0667; B60C 2015/0671; B60C 2015/0675
USPC ........................................................ 152/543
See application file for complete search history.

(56) References Cited

U.S. PATENT DOCUMENTS

| | | | |
|---|---|---|---|
| 4,846,238 A * | 7/1989 | Kadota | ............... B60C 15/0027 152/543 |
| 5,033,524 A | 7/1991 | Ohtsuka | |
| 6,591,883 B2 * | 7/2003 | Auxerre | ................. B60C 15/06 152/539 |

FOREIGN PATENT DOCUMENTS

| | | | | |
|---|---|---|---|---|
| JP | 07257118 A | * | 10/1995 | ......... B60C 15/0607 |
| JP | 11-20421 A | | 1/1999 | |
| JP | 2001010312 A | * | 1/2001 | |
| JP | 2001-225618 A | | 8/2001 | |
| JP | 2005096621 A | * | 4/2005 | |
| JP | 2008110624 A | * | 5/2008 | |
| JP | 2012254736 A | * | 12/2012 | |

OTHER PUBLICATIONS

Machine Translation: JP-2012254736-A; Todoroki, Daisuke; (Year: 2019).*
Machine Translation: JP-2001010312-A; Takada, Yoshiyuki; (Year: 2019).*
Machine Translation: JP-2005096621-A; Saeki, Tsutomu; (Year: 2019).*
Machine Translation: JP-60050006-A; Suzuki, Tatsuo; (Year: 2019).*
Machine Translation: JP-07257118-A; Nakasaki, Eiji; (Year: 2019).*
Extended European Search Report, dated Dec. 7, 2016, for European Application No. 16178372.5.

* cited by examiner

HEAVY-DUTY PNEUMATIC TIRE

BACKGROUND ART

Field of the Invention

The present invention relates to heavy-duty pneumatic tires, and in particular relates to a heavy-duty pneumatic tire having a bead portion with high durability.

Description of the Related Art

Japanese Unexamined Patent Application Publication No. 11-020421 discloses a heavy-duty pneumatic tire with a reinforcing layer in a bead portion. The reinforcing layer disclosed by the publication includes a first reinforcing layer of a steel cord that extends in a U-shaped manner to surround a bead core and a second reinforcing layer of an organic fiber cord that extends in a radial direction and is located axially outward of the first reinforcing layer.

Unfortunately, when the heavy-duty pneumatic tire disclosed by the publication is used in a hot climate or a region where braking is frequently necessary, a bead rubber component proximate to the rim flange is softened by a high temperature of the bead portion and would deform so as to lean on a rim flange, and then the rubber component becomes hardened. Such a hardened rubber may cause damage such as crack and the like. Accordingly, in the conventional art, there is room for improvement of bead durability.

SUMMARY OF THE INVENTION

In view of the above problems in the conventional art, the present invention has an object to provide a heavy-duty pneumatic tire capable of improving bead durability.

According to one aspect of the invention, a heavy-duty pneumatic tire including a tread portion, a pair of sidewall portions, a pair of bead portions each having a bead core therein, a carcass including a carcass ply including a main portion extending between the bead cores and a pair of turn-up portions each wound up around the bead core from axially inside to the outside of the tire, a first reinforcing layer of a steel cord disposed in each bead portion, the first reinforcing layer extending in a U-shaped manner to surround the bead core, a second reinforcing layer of an organic fiber cord disposed in each bead portion, at least a part of the second reinforcing layer extending in a radial direction of the tire at an axially outward location of the first reinforcing layer, the second reinforcing layer including an inner second ply being in contact with the first reinforcing layer and an outer second ply being in contact with the inner second ply, the outer second ply having an inner end positioned below the bead core, and the inner second ply having an inner end located axially inward of the inner end of the outer second ply, the inner second ply having a substantially same length as the outer second ply in a tire cross-section.

In another aspect of the invention, at least one of the bead cores may include a substantially hexagonal cross sectional shape having a radially inner surface, and an angle between the inner surface of the bead core and a rim seat may be zero plus/minus 3 degrees under both a standard condition and a loaded condition, wherein the standard condition is such that the tire is mounted on a standard wheel rim with a standard pressure and is loaded with no tire load, and wherein the loaded condition is such that the tire under the standard condition is grounded with a standard tire load at a camber angle of zero.

In another aspect of the invention, the organic fiber cord of the inner second ply may be oriented at an angle of from 55 to 75 degrees with respect to a radial direction of the tire, and the organic fiber cord of the outer second ply may be oriented at an angle of from 55 to 75 degrees with respect to the radial direction of the tire in an opposite direction to the inner second ply.

In another aspect of the invention, the inner second ply may include an outer end located radially outward of a radially outer end of the turn-up portion in each bead portion, and a distance between the outer end of the inner second ply and the outer end of the turn-up portion may be in a range of from 8 to 18 mm in a radial direction.

In another aspect of the invention, a distance between an outer end of the inner second ply and an outer end of the outer second ply may be in a range of from 8 to 18 mm in a radial direction.

In another aspect of the invention, a radial height of an outer end of the outer second ply from a bead base line may be in a range of from 25% to 40% of a radial height of the carcass from the bead base line.

DESCRIPTION OF THE PREFERRED EMBODIMENTS

Figure 1:
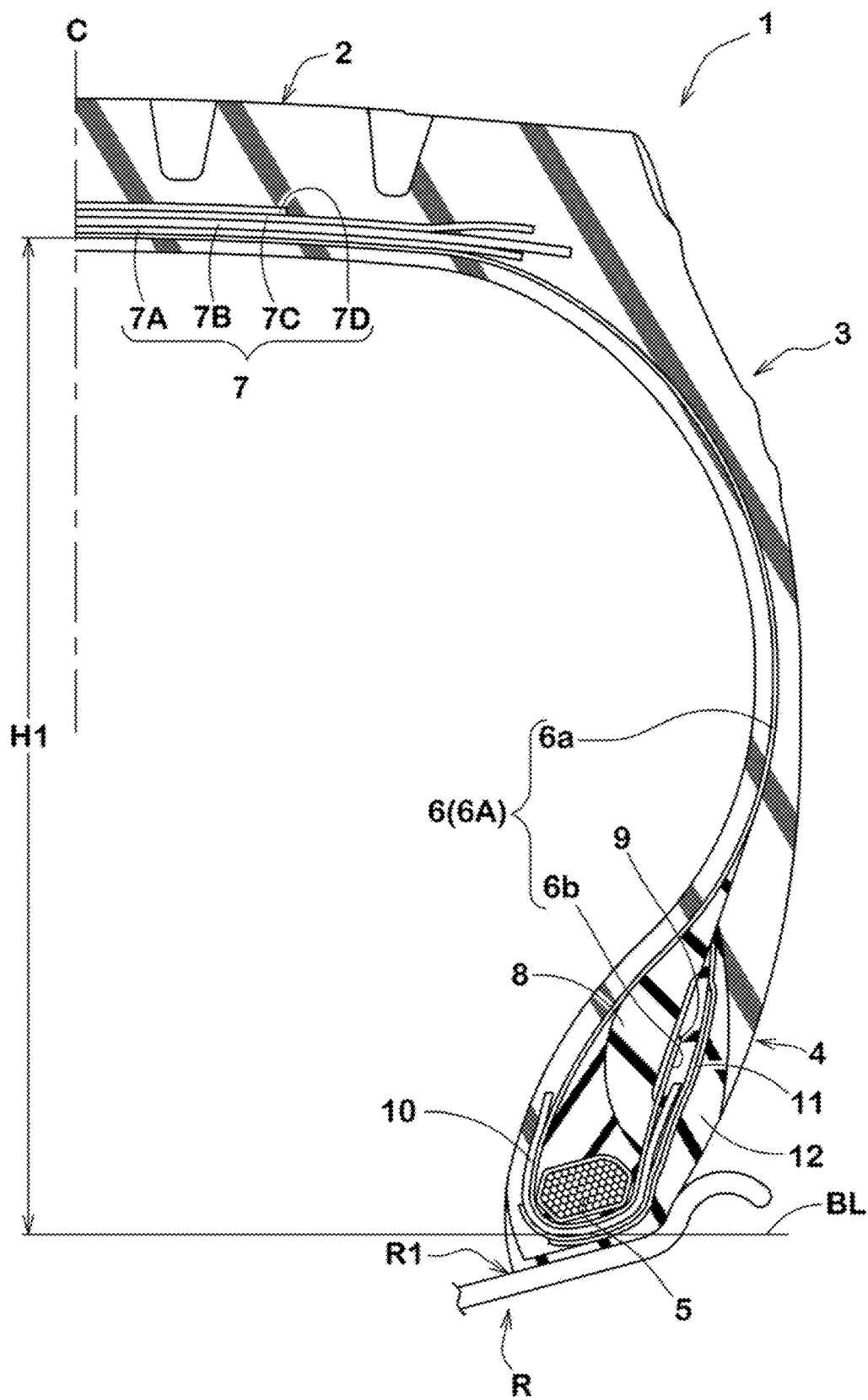
FIG. 1 is a cross-sectional view of a heavy-duty pneumatic tire according to an embodiment of the present invention.

An embodiment of the present invention will be explained below with reference to the accompanying drawings. FIG. 1 illustrates a right half cross-sectional view including a tire axis of a heavy-duty pneumatic tire 1 under a standard condition according to an embodiment of the present invention.

As used herein, the standard condition is such that the tire 1 is mounted on a standard wheel rim R with a standard pressure, and is loaded with no tire load. Unless otherwise noted, various dimensions, positions and the like of the tire refer to those under the standard condition of the tire.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As illustrated in FIG. 1, the tire 1 in accordance with the present embodiment includes a carcass 6 extending between a pair of bead cores 5 each disposed in each bead portion 4 through a tread portion 2 and a pair of sidewall portions 3. In this embodiment, the carcass 6 includes a single carcass ply 6A of a carcass cord.

The carcass ply 6A includes a main portion 6a and a pair of turn-up portions 6b. The main portion 6a is configured as a toroidal body extending between the bead cores 5 through the tread portion 2 and the sidewall portions 3. Each turn-up portion 6b is wound up around each bead core 5 from axially inside to the outside of the tire, and terminates at the radially outer end 9. The carcass 6 has a maximum height H1, which is a radial height of the main portion 6a of the carcass ply 6A from a bead base line BL, nearby the tire equator C.

Figure 2:
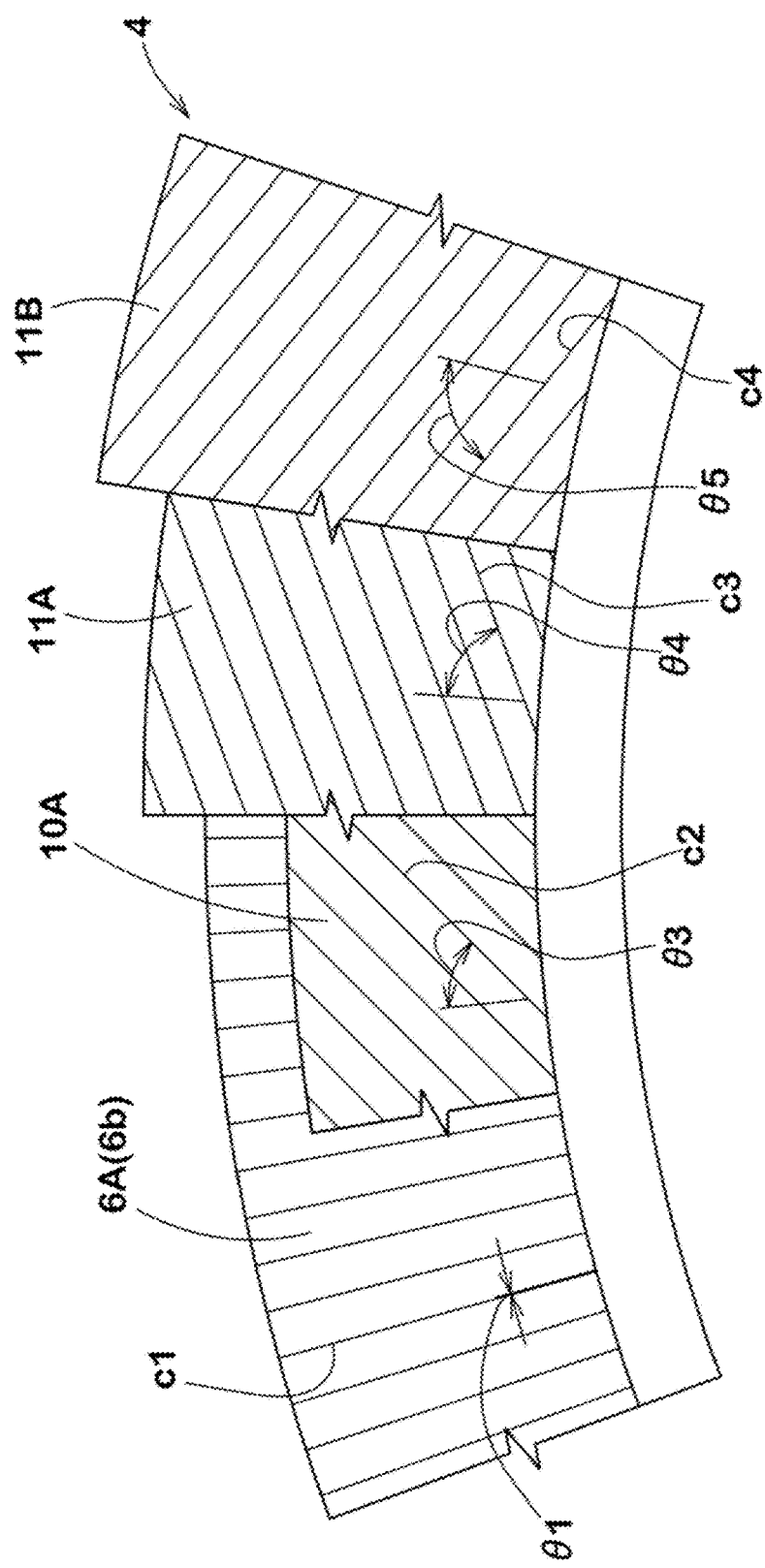
FIG. 2 is a side view of a bead portion of FIG. 1.

FIG. 2 illustrates a side view of the bead portion 4. As illustrated in FIG. 2, the carcass ply 6A preferably includes a steel carcass cord c1 oriented at an angle $\theta 1$ of from 0 to 20 degrees with respect to a radial direction of the tire. The tire 1 with such a carcass ply 6A (i.e., a radial carcass configuration) exhibits low rolling resistance and may contribute to low fuel consumption property.

As illustrated in FIG. 1, a belt layer 7 is preferably disposed on radially outwardly of the carcass 6 in the tread portion 2. The belt layer 7, for example, is configured as a plurality of belt plies of belt cords made of steel. In this embodiment, the belt layer 7 includes first to fourth belt plies 7A to 7D.

In this embodiment, each bead portion 4 is provided with a bead apex rubber 8 that extends radially outwardly from the bead core 5 in a tapered manner, a first reinforcing layer 10 that includes at least one ply of a steel cord, a second reinforcing layer 11 that includes at least one ply of an organic fiber cord and a chafer rubber 12 to be in contact with a rim seat R1 of the rim R.

Figure 3:
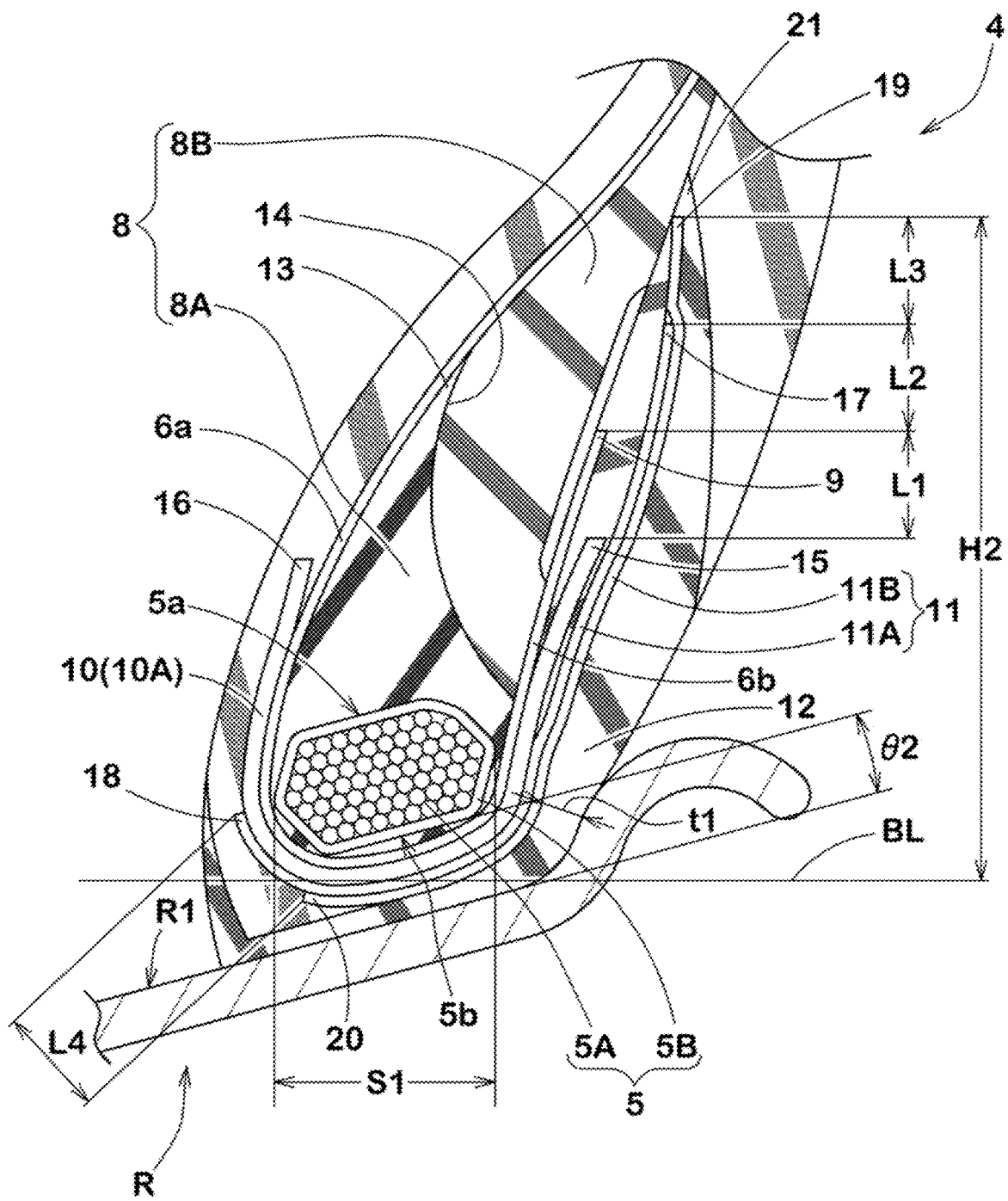
FIG. 3 is an enlarged cross-sectional view of the bead portion of FIG. 1.

FIG. 3 illustrates an enlarged cross-sectional view of one of the bead portions 4. As illustrated in FIG. 3, the bead core 5, for example, is configured as a wound body in which a steel wire is wound in plural in a width direction as well as in a radial direction of the tire so as to form a substantially hexagonal cross-sectional shape, for example. The bead core 5 includes a radially outer surface 5a that is located radially outwardly and extends in the axial direction of the tire and a radially inner surface 5b that is located radially inwardly and extends in the axial direction of the tire.

Preferably, an angle $\theta 2$ between the inner surface 5b of the bead core 5 and the rim seat R1 of the rim R is zero plus/minus 3 degrees under both the standard condition and a loaded condition, wherein the loaded condition is such that the tire under the standard condition is grounded with a standard tire load at a camber angle of zero. The tire 1 with such a bead configuration may suppress a rotation of the bead core 5 when traveling so as to reduce tension of the carcass ply 6A in the bead portion 4, and thus bead durability can be improved.

As used herein, the standard tire load is a tire load officially approved or recommended for the tire by standards organizations, wherein the standard tire load is the "maximum load capacity" in JATMA, the "Load Capacity" in ETRTO, and the maximum value given in the above-mentioned table in TRA or the like.

For example, when the standard wheel rim R is a 15-degree tapered rim, the above mentioned bead configuration may be obtained by incorporating a bead core 5 into a raw tire, wherein the bead core 5 has an inner surface 5b inclined at an angle of approximately 20 degrees with respect to the axial direction of the tire so as to enlarge its inner diameter toward axially outwardly before being incorporated to the tire. The 15-degree tapered rim is a rim that includes a rim seat R1 inclined at an angle of approximately 15 degrees with respect to the axial direction of the tire so as to enlarge its outer diameter toward axially outwardly.

Preferably, the bead core 5 includes a core main body 5A made of a steel wire and a wrapping layer surrounding the core main body 5A. The wrapping layer 5B, for example, may be formed of an organic fiber cloth.

In this embodiment, the bead apex rubber 8, for example, includes an inner apex 8A and an outer apex 8B disposed radially outwardly of the inner apex 8A.

The inner apex 8A, for example, has a substantially triangular cross-section extending radially outwardly from the bead core 5 between the main portion 6a and the turn-up portion 6b. The radially outer end 13 of the inner apex 8A, for example, is located on an axially outer surface of the main portion 6a. Furthermore, the outer end 13 of the inner apex 8A is preferably located radially outward of the outer end 9 of the turn-up portion 6b. In this embodiment, the inner apex 8A has a complex modulus $E^*1$ of from 40 to 65 MPa, for example.

The outer apex 8B, for example, is superimposed on the inner apex 8A through a boundary 14 extending radially inwardly from the outer end 13 of the inner apex 8A to the turn-up portion 6b. Preferably, the outer apex 8B has a complex modulus $E^*2$ smaller than that of the inner apex 8A, and more preferably the complex modulus $E^*2$ is in a range of from 3 to 5 MPa.

The bead apex rubber 8 may moderate shearing stress concentration on the turn-up portion 6b of the carcass ply 6A by the outer apex 8B with low elasticity to prevent separation while offering high bending rigidity in the bead portion 4.

The first reinforcing layer 10 is configured as at least one steel cord ply 10A (e.g. one ply in this embodiment). The first reinforcing layer 10 made of the steel cord ply 10A can reinforce bending rigidity of the bead portion 4 so as to suppress large bending deformation of the bead portion 4 around the bead core 5.

The steel cord ply 10A, in a tire cross section, extends in a U-shaped manner at least partially to surround the bead core through the carcass ply 6A. In this embodiment, at least a part of the steel cord ply 10A, for example, is in contact with not only the main portion 6a but also the turn-up portion 6b. Thus, the steel cord ply 10A can reinforce the bead portion 4 effectively while ensuring ride comfort. However, the shape of the steel cord ply 10A is not particularly limited to the above aspect.

The steel cord ply 10A includes an outer end 15 that is located radially inward of the outer end 9 of the turn-up portion 6b at a distance L1. This prevents strain concentration at the outer end 15 of the steel cord ply 10A. Accordingly, separation of tire components starting from the outer end 15 can be prevented.

Preferably, the distance L1 is in a range of from 8 to 18 mm in order to suppress the separation more effectively while reinforcing bending rigidity of the bead portion 4.

The steel cord ply 10A includes an inner end 16 that is located radially inward of the outer end 13 of the inner apex 8A, for example. Preferably, inner end 16 of the steel cord ply 10A is located radially inward of the outer end 15 of the steel cord ply 10A. Such a steel cord ply 10A would have a relatively short length, which is measured along its shape, and thus it is possible to balance lightening and reinforcing effect.

As illustrated in FIG. 2, steel cords c2 of the steel cord ply 10A are preferably oriented at an angle $\theta 3$ of from 30 to 70 degrees with respect to the radial direction of the tire. Preferably, the number of steel cords c2 is set in a range of from 20 to 40 per a 50 cm width of the ply.

As illustrated in FIG. 3, at least a part of the second reinforcing layer 11 extends in the radial direction of the tire on the side of axially outward location of the first reinforcing layer 10. In this embodiment, the second reinforcing layer 11 includes an inner second ply 11A in contact with the first reinforcing layer 10 and an outer second ply 11B in contact with the inner second ply 11A at an axially outer side of the inner second ply 11A. Preferably, the inner and outer second plies 11A and 11B of the second reinforcing layer 11 include an organic fiber cord. The second reinforcing layer 11 may prevent that the chafer rubber 12 in contact with the rim seat R1 softens even when the bead portion 4 become in high temperature. Thus, damage based on hardened rubber in the bead portion 4 can be prevented.

The inner second ply 11A and the outer second ply 11B are superimposed each other to cover the outer end 15 of the steel cord ply 10A from axially outside of the tire. The second reinforcing layer 11 composed of two organic fiber cord plies has better flexibility and adhesion property than the steel cord ply 10A. Thus, stress concentration on the outer end 15 of the steel cord ply 10A can be moderated, and the separation thereto would be prevented in long term. Furthermore, the second reinforcing layer 11 can reduce shearing stress as well as the strain based on the stress acting on the turn-up portion 6b of the carcass ply 6A.

In this embodiment, the radially outer end 17 of the inner second ply 11A is located radially outward of the outer end 9 of the turn-up portion 6b at a distance L2. Thus, the inner second ply 11A covers the outer end 9 of the turn-up portion 6b. Accordingly, the separation to be generated from the outer end 9 of the turn-up portion 6b can effectively be prevented.

Preferably, the distance L2 is in a range of from 8 to 18 mm in order to further improve the above advantageous effect.

Preferably, the distance L2 between the outer end 17 of the inner second ply 11A and the outer end 9 of the turn-up portion 6b is approximately same as the distance L1 between the outer end 9 of the turn-up portion 6b and the outer end 16 of the steel cord ply 10A. Thus, the stress acting on the bead portion 4 can be distributed equally to improve bead durability of the tire.

The radially inner end 18 of the inner second ply 11A is located radially inward of both outer end 15 and inner end 16 of the steel cord ply 10A. Furthermore, the inner end 18 of the inner second ply 11A is preferably located axially inward of the inner end 20 of the outer second ply 11B. Thus, the strain concentration on or around the inner end 18 of the inner second ply 11A can be reduced so that the separation to be generated from the inner end 18 of the inner second ply 11A is prevented.

The radially outer end 19 of the outer second ply 11B, for example, is located radially outward of the outer end 17 of the inner second ply 11A at a distance L3. Thus, the outer second ply 11B covers the outer end 17 of the inner second ply 11A which tends to receive tensile stress of the carcass ply 6A. Accordingly, the separation to be generated from the outer end 17 of the inner second ply 11A would be prevented.

Preferably, the distance L3 is in a range of from 8 to 18 mm in order to further improve the above advantageous effect.

Preferably, the distance L3 between the outer end 19 of the outer second ply 11B and the outer end 17 of the inner second ply 11A is approximately same as the distance L2 between the outer end 17 of the inner second ply 11A and the outer end 9 of the turn-up portion 6b. Thus, the stress acting on the bead portion 4 can be distributed equally to improve bead durability of the tire.

Preferably, a radial height H2 of the outer end 19 of the outer second ply 11B from the bead base line BL is in a range of from 25% to 40% of the maximum height H1 of the carcass 6 from the bead base line BL in order to further improve bead durability as well as suppression of separation on the outer end 19 of the outer second ply 11B.

In this embodiment, the radially inner end 20 of the outer second ply 11B is located in a region S1 which is below the bead core 5 (i.e., a radially inner region of the bead core). Thus, the outer second ply 11B would be firmly held so as not to move even when a large tensile force acts on the carcass ply 6A. Accordingly, the tire 1 in accordance with the embodiment can prevent damage in the bead portion 4 such as crack and the like since the strain caused by tensile force acted on the carcass ply 6A is reduced. As a result, bead durability of the tire can further be improved.

The distance L4 between the inner end 20 of the outer second ply 11B and the inner end 18 of the inner second ply 11A is approximately same as the distance L3 between the outer end 19 of the outer second ply 11B and the outer end 17 of the inner second ply 11A. That is, the outer second ply 11B preferably has approximately same length, which is measured along its shape, as the inner second ply 11A. Thus, the same ply can be employed for the outer second ply 11B and the inner second ply 11A. This makes it possible to reduce manufacturing cost by using a ply in common for different portions.

As illustrated in FIG. 2, the inner second ply 11A preferably includes organic fiber cords c3 oriented at an angle $\theta 4$ of from 40 to 80 degrees, more preferably 55 to 75 degrees with respect to the radial direction of the tire. The inner second ply 11A can effectively reduce tensile force to be acted on the carcass ply 6A.

Preferably, the outer second ply 11B includes organic fiber cords c4 oriented at an angle $\theta 5$ of from 40 to 80 degrees, more preferably 55 to 75 degrees with respect to the radial direction of the tire in an opposite direction to the organic fiber cords c3 of the inner second ply 11A. The outer second ply 11B can also effectively reduce tensile force to be acted on the carcass ply 6A.

Preferably, the angle $\theta 4$ of each organic fiber cord c3 of the inner second ply 11A is approximately same as the angle $\theta 5$ of each organic fiber cord c4 of the outer second ply 11B. The inner second ply 11A, in cooperation with the outer second ply 11B, can effectively reduce the tensile force acted on the carcass ply.

The respective inner second ply 11A and the outer second ply 11B, for example, may be configured from the same plies which are set inside out with each other. Thus it is possible to use the same plies in common for the inner second ply 11A and the outer second ply 11B, and reduces manufacturing cost of tires 1.

In each of the inner second ply 11A and the outer second ply 11B, each number of organic fiber cords c3 and c4 is preferably in a range of from 20 to 40 per a 50 mm width of the plies. For the organic fiber cords c3 and c4. a nylon cord, a polyester cord, an aromatic polyamide cord, a high modulus vinylon cord and the like may be employed, for example. Such an organic fiber cord ply has better flexibility and adhesion property than the steel cord ply.

Referring back to FIG. 3, the chafer rubber 12 is disposed axially outward of the second reinforcing layer 11 and extends radially inwardly of the bead core 5 so that the chafer rubber 12 is in contact with the rim seat R1 when the tire is mounted on the rim R. The radially outer end 21 of the chafer rubber 12, for example, is located radially outward of the outer end 19 of the outer second ply 11B.

Preferably, the minimum thickness t1 of the chafer rubber 12 in an axially outer region of the bead core 5 may be in a range of from 2.5 to 6.0 mm in order to suppress not only damage such as a crack but also large strain on the outer surface of the chafer rubber 12.

Preferably, the complex modulus E*3 of the chafer rubber 12 is set in a range of from 7 to 14 MPa, more preferably 9 to 13 MPa in order to suppress not only damage such as a crack but also large strain on the outer surface of the chafer rubber 12.

While the particularly preferable embodiments in accordance with the present invention have been described in detail, the present invention is not limited to the illustrated embodiments, but can be modified and carried out in various aspects.

Example

Figure 4:
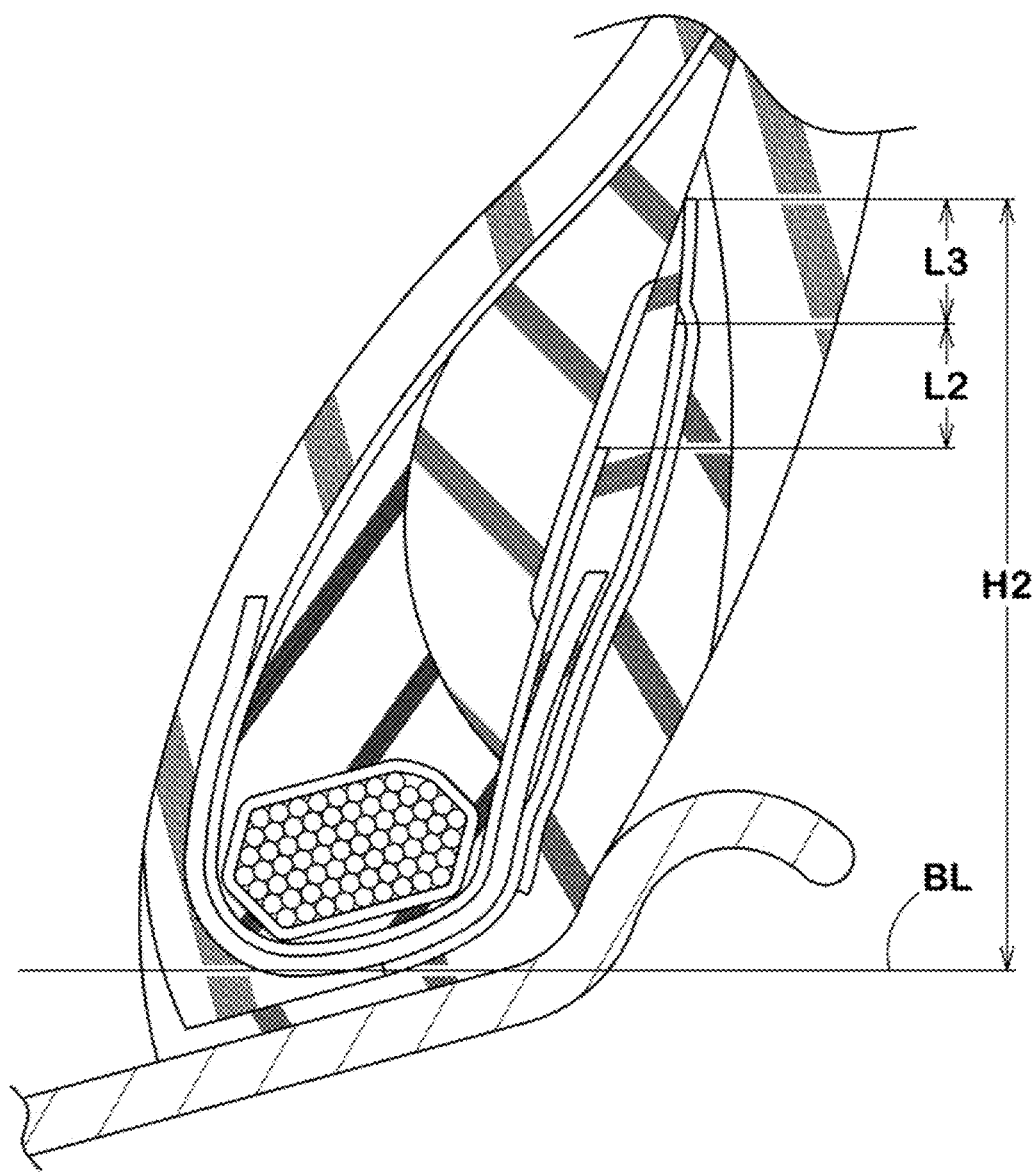
FIG. 4 is an enlarged cross-sectional view of a bead portion of a heavy-duty pneumatic tire according to a comparative example.

Heavy duty pneumatic tires (295/80R22.5) having a basic structure illustrated in FIG. 1 were manufactured based on the detail shown in Table 1 and Table 2. As for a comparative example tire, a heavy-duty pneumatic tire with a bead portion which is provided with a second reinforcing layer that extends only an axially outward location of the bead core (i.e., it does not extend below the bead core) was also manufactured as shown in FIG. 4. Then, bead durability of each test tire was tested. Common specification and test method are as follows:

Rim: 22.5×9.00
Inner pressure: 850 kPa
Bead Durability Test 1:

Each test tire was run on a drum tester under a 200% standard load at speed of 20 km/h, and then the runnable distance without generating damage on the bead portion was measured. The test results are shown in Tables 1 and 2 with an index based on Ref. being 100. The larger the value, the better the performance is.

Bead Durability Test 2:

Each test tire was run on a drum tester under the standard load at speed of 20 km/h after the rim had been heated up to 140 degrees Celsius, and then the runnable distance without generating damage on the bead portion was measured. The test results are shown in Tables 1 and 2 with an index based on Ref. being 100. The larger the value, the better the performance is.

The test results are shown in Tables 1 and 2. From the test results, it is confirmed that the example tires exerts excellent bead durability.

TABLE 1

|  | Ref. | Ex. 1 | Ex. 2 | Ex. 3 | Ex. 4 |
|---|---|---|---|---|---|
| Location of inner end of outer second ply | Axially outward of bead core | Below bead core | Below bead core | Below bead core | Below bead core |
| Outer second ply cord angle θ5 (deg.) | 65 | 65 | 10 | 80 | 65 |
| Inner second ply cord angle θ4 (deg.) | 65 | 65 | 10 | 80 | 65 |
| Distance L2 (mm) | 13 | 13 | 13 | 13 | 4 |
| Distance L3 (mm) | 13 | 13 | 13 | 13 | 13 |
| Ratio H2/H1 (%) | 32 | 32 | 32 | 32 | 28 |
| Bead burablity test 1 (Index) | 100 | 150 | 120 | 120 | 110 |
| Bead burablity test 2 (Index) | 100 | 150 | 120 | 120 | 110 |

TABLE 2

|  | Ex. 5 | Ex. 6 | Ex. 7 | Ex. 8 | Ex. 9 |
|---|---|---|---|---|---|
| Location of inner end of outer second ply | Below bead core | Below bead core | Below bead core | Below bead core | Below bead core |
| Outer second ply cord angle θ5 (deg.) | 65 | 65 | 65 | 65 | 65 |
| Inner second ply cord angle θ4 (deg.) | 65 | 65 | 65 | 65 | 65 |
| Distance L2 (mm) | 36 | 13 | 13 | 4 | 36 |
| Distance L3 (mm) | 13 | 4 | 36 | 4 | 36 |
| Ratio H2/H1 (%) | 41 | 28 | 41 | 24 | 50 |
| Bead burablity test 1 (Index) | 110 | 120 | 120 | 110 | 120 |
| Bead burablity test 2 (Index) | 150 | 140 | 130 | 110 | 130 |

What is claimed is:

1. A heavy-duty pneumatic tire comprising:
a tread portion;
a pair of sidewall portions;
a pair of bead portions each having a bead core therein, each bead core having a radially innermost end position thereof and an axially innermost end position thereof, each bead portion being provided with a bead apex rubber that extends radially outwardly from the bead core in a tapered manner and that includes an inner apex and an outer apex disposed radially outwardly of the inner apex;
a carcass comprising a carcass ply comprising a main portion extending between the bead cores and a pair of turn-up portions each wound up around the bead core from axially inside to the outside of the tire;
a first reinforcing layer of a steel cord disposed in each bead portion, the first reinforcing layer extending in a U-shaped manner to surround the bead core; and
a second reinforcing layer of an organic fiber cord disposed in each bead portion, at least a part of the second reinforcing layer extending in a radial direction of the tire at an axially outward location of the first reinforcing layer, the second reinforcing layer comprising an inner second ply being in contact with the first reinforcing layer and an outer second ply being in contact with the inner second ply,
wherein
the outer second ply has an inner end positioned below the bead core,
the inner second ply has an inner end located axially inward of the inner end of the outer second ply,
the inner end of the inner second ply is located radially outward of the radially innermost end position of the bead core and located radially inward of the axially innermost end position of the bead core,
the inner second ply has substantially the same length as the outer second ply in a tire cross-section,
in each bead portion, the inner apex has a substantially triangular cross-section extending from the bead core to a radially outer end thereof which is located radially outward of a radially outer end of the turn-up portion,
the inner apex has a complex modulus E*1 of from 40 to 65 MPa,
the outer apex is superimposed on the inner apex through a boundary extending radially inwardly from the radially outer end of the inner apex to the turn-up portion, and
the outer apex has a complex modulus E*2 in a range of from 3 to 5 MPa.

2. The heavy-duty pneumatic tire according to claim 1, wherein
at least one of the bead cores comprises a substantially hexagonal cross-sectional shape having a radially inner surface, and
an angle between the inner surface of the bead core and a rim seat is zero plus/minus 3 degrees under both a standard condition and a loaded condition,
wherein the standard condition is such that the tire is mounted on a standard wheel rim with a standard pressure and is loaded with no tire load, and wherein the loaded condition is such that the tire under the standard condition is grounded with a standard tire load at a camber angle of zero.

3. The heavy-duty pneumatic tire according to claim 1, wherein
the organic fiber cord of the inner second ply is oriented at an angle of from 55 to 75 degrees with respect to a radial direction of the tire, and
the organic fiber cord of the outer second ply is oriented at an angle of from 55 to 75 degrees with respect to the radial direction of the tire in an opposite direction to the inner second ply.

4. The heavy-duty pneumatic tire according to claim 1, wherein
the inner second ply comprises an outer end located radially outward of a radially outer end of the turn-up portion in each bead portion, and
a distance between the outer end of the inner second ply and the outer end of the turn-up portion is in a range of from 8 to 18 mm in a radial direction.

5. The heavy-duty pneumatic tire according to claim 1, wherein a distance between an outer end of the inner second ply and an outer end of the outer second ply is in a range of from 8 to 18 mm in a radial direction.

6. The heavy-duty pneumatic tire according to claim 1, wherein a radial height of an outer end of the outer second ply from a bead base line is in a range of from 25% to 40% of a radial height of the carcass from the bead base line.

7. The heavy-duty pneumatic tire according to claim 1, each bead portion further comprising a chafer rubber, wherein
the chafer rubber is disposed axially outward of the second reinforcing layer and extends radially inwardly of the bead core so that the chafer rubber is configured to be in contact with a rim seat when the tire is mounted on a rim,
the chafer rubber has a radially outer end which is located radially outward of a radially outer end of the outer second ply,
the chafer rubber has a minimum thickness of at an axially outer region of the bead core in a range of from 2.5 to 6.0 mm, and
the chafer rubber has a complex modulus $E^*3$ in a range of from 7 to 14 MPa.

8. The heavy-duty pneumatic tire according to claim 1, wherein the inner second ply has the same length as the outer second ply in a tire cross-section.

9. The heavy-duty pneumatic tire according to claim 1,
wherein the inner end of the outer second ply is located between the radially innermost end position of the bead core and the axially innermost end position of the bead core in the tire axial direction, and
wherein the inner end of the outer second ply is located nearer to the radially innermost end position of the bead core than the axially innermost end position of the bead core in the tire axial direction.

10. A heavy-duty pneumatic tire comprising:
a tread portion;
a pair of sidewall portions;
a pair of bead portions each having a bead core therein, each bead core having a radially innermost end position thereof and an axially innermost end position thereof;
a carcass comprising a carcass ply comprising a main portion extending between the bead cores and a pair of turn-up portions each wound up around the bead core from axially inside to the outside of the tire;
a first reinforcing layer of a steel cord disposed in each bead portion, the first reinforcing layer extending in a U-shaped manner to surround the bead core; and
a second reinforcing layer of an organic fiber cord disposed in each bead portion, at least a part of the second reinforcing layer extending in a radial direction of the tire at an axially outward location of the first reinforcing layer, the second reinforcing layer comprising an inner second ply being in contact with the first reinforcing layer and an outer second ply being in contact with the inner second ply,
wherein
the outer second ply has an inner end positioned below the bead core,
the inner second ply has an inner end located axially inward of the inner end of the outer second ply,
the inner end of the inner second ply is located radially outward of the radially innermost end position of the bead core and located radially inward of the axially innermost end position of the bead core,
the inner second ply has substantially the same length as the outer second ply in a tire cross-section;
a chafer rubber disposed in each bead portion, wherein
the chafer rubber is disposed axially outward of the second reinforcing layer and extends radially inwardly of the bead core so that the chafer rubber is configured to be in contact with a rim seat when the tire is mounted on a rim,
the chafer rubber has a radially outer end which is located radially outward of a radially outer end of the outer second ply,
the chafer rubber has a minimum thickness of at an axially outer region of the bead core in a range of from 2.5 to 6.0 mm, and
the chafer rubber has a complex modulus $E^*3$ in a range of from 7 to 14 MPa.

11. The heavy-duty pneumatic tire according to claim 10, wherein the inner second ply has the same length as the outer second ply in a tire cross-section.

12. The heavy-duty pneumatic tire according to claim 10,
wherein the inner end of the outer second ply is located between the radially innermost end position of the bead core and the axially innermost end position of the bead core in the tire axial direction, and
wherein the inner end of the outer second ply is located nearer to the radially innermost end position of the bead core than the axially innermost end position of the bead core in the tire axial direction.

13. A heavy-duty pneumatic tire comprising:
a tread portion;
a pair of sidewall portions;
a pair of bead portions each having a bead core therein, each bead core having a radially innermost end position thereof and an axially innermost end position thereof;
a carcass comprising a carcass ply comprising a main portion extending between the bead cores and a pair of turn-up portions each wound up around the bead core from axially inside to the outside of the tire;

a first reinforcing layer of a steel cord disposed in each bead portion, the first reinforcing layer extending in a U-shaped manner to surround the bead core;

a second reinforcing layer of an organic fiber cord disposed in each bead portion, at least a part of the second reinforcing layer extending in a radial direction of the tire at an axially outward location of the first reinforcing layer, the second reinforcing layer comprising an inner second ply being in contact with the first reinforcing layer and an outer second ply being in contact with the inner second ply, wherein the outer second ply has an inner end positioned below the bead core, the inner second ply has an inner end located axially inward of the inner end of the outer second ply, the inner end of the inner second ply is located radially outward of the radially innermost end position of the bead core and located radially inward of the axially innermost end position of the bead core, and the inner second ply has substantially the same length as the outer second ply in a tire cross-section.

14. The heavy-duty pneumatic tire according to claim 13, wherein at least one of the bead cores comprises a substantially hexagonal cross-sectional shape having a radially inner surface, and an angle between the inner surface of the bead core and a rim seat is zero plus/minus 3 degrees under both a standard condition and a loaded condition, wherein the standard condition is such that the tire is mounted on a standard wheel rim with a standard pressure and is loaded with no tire load, and wherein the loaded condition is such that the tire under the standard condition is grounded with a standard tire load at a camber angle of zero.

15. The heavy-duty pneumatic tire according to claim 13, wherein the organic fiber cord of the inner second ply is oriented at an angle of from 55 to 75 degrees with respect to a radial direction of the tire, and the organic fiber cord of the outer second ply is oriented at an angle of from 55 to 75 degrees with respect to the radial direction of the tire in an opposite direction to the inner second ply.

16. The heavy-duty pneumatic tire according to claim 13, wherein the inner second ply comprises an outer end located radially outward of a radially outer end of the turn-up portion in each bead portion, and a distance between the outer end of the inner second ply and the outer end of the turn-up portion is in a range of from 8 to 18 mm in a radial direction.

17. The heavy-duty pneumatic tire according to claim 13, wherein a distance between an outer end of the inner second ply and an outer end of the outer second ply is in a range of from 8 to 18 mm in a radial direction.

18. The heavy-duty pneumatic tire according to claim 13, wherein a radial height of an outer end of the outer second ply from a bead base line is in a range of from 25% to 40% of a radial height of the carcass from the bead base line.

19. The heavy-duty pneumatic tire according to claim 13, wherein the inner second ply has the same length as the outer second ply in a tire cross-section.

20. The heavy-duty pneumatic tire according to claim 13, wherein the inner end of the outer second ply is located between the radially innermost end position of the bead core and the axially innermost end position of the bead core in the tire axial direction, and wherein the inner end of the outer second ply is located nearer to the radially innermost end position of the bead core than the axially innermost end position of the bead core in the tire axial direction.

* * * * *